Patented Oct. 26, 1943

2,332,542

UNITED STATES PATENT OFFICE 2,332,542

BITUMINOUS EMULSION AND METHOD OF PREPARING SAME

Vilas E. Watts and Paul E. McCoy, San Francisco, Calif., assignors to American Bitumuls Company, San Francisco, Calif., a corporation of Delaware No Drawing. Application July 31, 1940, Serial No. 348,680

5 Claims. (Cl. 252—311.5)

This invention relates to the manufacture of stable emulsions or dispersions and has to do in particular with the manufacture of bituminous emulsions resistant to premature breaking, inversion, sedimentation or decomposition.

An object of the invention is the manufacture of stable bitumen-in-water emulsions suitable for mixture with both fine and coarse aggregates, including rock and sand and the like, and mixtures of aggregates with useful quantities of finely divided solids and especially Portland cement.

Another object is to manufacture bituminous emulsions which will not lose their original characteristics during cycles of freezing and thawing.

Another object is to produce a bituminous emulsion capable of withstanding the addition of large quantities of electrolytes and acidic solutions.

Another object is to produce a highly stable bituminous oil-in-water emulsion, owing its primary emulsification to the reaction products of high molecular weight organic acids and alkaline water, which emulsion nevertheless has neutral or acid properties, and may be stored for long periods.

Another object is to produce an emulsion which has properties which make it especially desirable for the addition of it to concrete mortars.

Another object of this invention is to overcome the demulsifying effect of various elements, such as calcium and magnesium, found in ingredients used in the manufacturing of bituminous emulsions.

Another object is successfully to manufacture extremely stable bituminous emulsions with the use of the waste liquor of the paper pulp industry containing amounts of calcium and/or magnesium which normally prevent the formation of emulsions or destroy the stabilizing effects of such waste liquor.

Another object is to supply a use for a portion of the vast amount of such waste liquor which is discarded each year.

Other objects will be apparent from the following discussion and description of methods for carrying out the invention and of the materials suitable therefor.

The term "bituminous emulsions" used herein comprehends emulsions or dispersions of asphalt, pitch, tar, oils and other similar hydrocarbon products which are normally solid, semi-solid, or highly viscous. Water is generally employed as the external or continuous phase.

As is well known, certain bituminous materials naturally contain ingredients which react with alkaline materials, such as caustic soda, caustic potash, soda ash, sodium metasilicate, potassium carbonate, to form emulsifying agents. These ingredients which occur naturally in certain bituminous materials are often referred to as asphaltogenic acids and their reaction products with alkalies are usable either alone or in conjunction with other primary emulsifiers to produce bituminous emulsions.

In the practice of the invention described and claimed herein, it is preferred to use primary bituminous emulsions in which the reaction products of alkaline materials with naturally occurring constituents of the bitumen are the sole primary emulsifying agents. However, it is also possible to use suitable auxiliary primary emulsifying agents. For instance, high molecular weight naphthenic acids may be employed in the same manner as said asphaltogenic acids. The alkaline salts thereof may be formed in situ or may be added separately. Also, high molecular weight acids formed by partial oxidation of petroleum hydrocarbons by methods known in the art may also be used. It is preferred, however, not to use low molecular weight fatty acid soaps.

One exemplification of applicants' invention pertains to a method of use in the manufacture of bituminous emulsions of waste sulfite liquor containing substantial quantities of calcium or magnesium, or both. In its broader aspects applicants' invention is not to be considered limited to a method of using waste liquors of the pulp industry or waste sulfite liquor in particular. However, applicants have found that the utilization of calcium and/or magnesium-containing waste sulfite liquor is a particular desirable application of their invention. Applicants have in part illustrated their invention herein in connection with such use.

The use of waste sulfite liquor in general in connection with the manufacture and treatment of bituminous emulsions has been variously disclosed and attempted. Applicants disclose herein a new and more advantageous method of using waste sulfite liquor of the paper pulp industry in the manufacture and treatment of bituminous emulsions.

There are various methods of manufacturing paper pulp from wood. One of the main methods is the sulfite cooking process. Sulfur dioxide is passed through water in which usually calcium and/or magnesium hydroxide or calcium and/or magnesium carbonate has been dissolved or suspended, in order to form calcium and/or magnesium bisulfite, which constitutes the cooking liquor of the sulfite process. Wood chips are then cooked in such liquor. The cellulose being insoluble in the liquor is taken off in the form of pulp and made into paper. Approximately 50% of the total weight of the wood chips is dissolved in the waste liquor, as reaction products of the sugars, resins and lignins of the wood.

Much is still unknown concerning the various reactions which take place, but the most important reaction is the formation of calcium and/or magnesium salts of lignin-sulfonic acid.

In the future in this application and appended claims no reference will be made to magnesium, but it is to be understood that wherever "calcium" is used the word "magnesium" may be substituted.

Analyses of waste calcium sulfite liquor made in different plants and from different types of woods will vary considerably, but they all have in common a considerable amount of free calcium ions. The effect of free calcium ions on unstable primary or penetration type bituminous oil-in-water emulsions, both after such emulsions are formed and during their formation, is well known. Most such bituminous emulsions are quickly broken or reversed in phase by the additions of solutions containing free calcium ions. In fact, a common test to determine the stability of bituminous emulsions is the so-called Myers test whereby calcium chloride is added to an asphalt emulsion. The demulsifying effect of the addition of solutions containing free calcium ions to oil-in-water emulsions generally results in the formation of insoluble calcium soaps.

As stated above, most waste sulfite liquors contain large quantities of soluble calcium salts of lignin-sulfonic acids. The presence of the free calcium ions in such waste sulfite liquor makes it substantially impossible to use such untreated waste sulfite liquor as a stabilizer in manufacture of bituminous emulsions. The untreated calcium ions present if applied to a preformed, penetration-type, primary bituminous emulsions cause it to break.

Various attempts have been made to employ calcium-containing waste sulfite liquor as a stabilizer for preformed, penetration-type, primary bituminous emulsions. However, in spite of the claims which have been made, such waste sulfite liquor has never been successfully used as a stabilizer for preformed primary emulsions in the absence of some method of providing for the demulsifying effect of the calcium. Various methods have been disclosed to overcome the demulsifying effect of the free calcium ions. Among the methods which have been disclosed is the treatment of the waste sulfite liquor with componds which will convert the calcium of the waste liquor into insoluble calcium compounds which are removed after being precipitated. For instance, the waste sulfite liquor can be treated with sodium carbonate with the result that the calcium in the waste liquor is precipitated as finely divided calcium carbonate, which is removed from the solution. Other compounds, obviously, such as tri-sodium phosphate, may be substituted for sodium carbonate to precipitate the calcium. While such method of trying to remove the calcium as described above from the waste sulfite liquor, in order to produce a bituminous emulsion stabilizer, is operable within limits, it is subject to certain serious objections which are avoided by the method applicants disclose in this application.

In the first place, separating the precipitate from the decalcinated liquor is expensive in that it involves considerable additional plant facilities and operations and in that the settling of the calcium precipitate is slow. Further, the decanting or filtering of the decalcinated liquor is as a practical matter never complete and some calcium is left in the liquor. In any case, the attempted separation of the precipitate from the liquor involves a loss of a portion of the waste sulfite liquor.

There exists an even greater objection to the method of trying to remove the calcium by precipitation and separation.

The treatment of a complex organic compound, such as calcium salts of lignin-sulfonic acids, containing free calcium, loosely bound calcium, and firmly bound calcium, with chemical agents such as sodium carbonate or tri-sodium phosphate which react spontaneously with the free calcium to form an insoluble precipitant which is removable, is only temporarily effective because the calcium ligno-sulfonates in the waste sulfite liquor treated in such manner continue to throw off additional free calcium upon standing, due to the liberation of additional loosely bound calcium from the ligno-sulfonate molecule. This is believed due to the removal of the back pressure normally set up by the free calcium ions ordinarily present in the raw waste calcium sulfite liquor. Therefore, treatments of the waste sulfite liquor in order to avoid the demulsifying effect of the calcium present which depend upon the removal of the calcium as an insoluble compound are a temporary measure only and are not to be confused with applicants' process disclosed herein.

The difficulty of removing the calcium by precipitation and the inadequacy of such method as well as the undesirability of precipitating the calcium compounds of the waste calcium sulfite liquor and leaving the precipitate in the liquor are shown in the following experiment conducted by applicants. The calcium-containing waste sulfite liquor was well mixed with sodium carbonate in a drum having an inside diameter of 23 inches and a height of 29.5 inches. The contents of the drum were allowed to settle three weeks. The examination of the drum after such period gave the data shown in Table I below:

Table I

| | Inches |
|---|---|
| Total height of drum's contents | 17.0 |
| Height of limestone sludge | 5.5 |
| Height of treated waste sulfite liquor | 11.5 |
| Per cent sludge (by weight) | 32.3 |
| Per cent of treated waste sulfite liquor | 67.7 |

It has been proposed by others to treat calcium-containing waste sulfite liquor with a calcium precipitant such as sodium carbonate or tri-sodium phosphate and to leave the resultant precipitant in the waste sulfite liquor used as a stabilizer for bituminous emulsions. Such method is wholly unsatisfactory for a variety of reasons. In the first place the precipitated calcium compound in part gradually goes back into solution. Further, the presence of the precipitated insoluble finely-divided calcium compounds in a bituminous emulsion greatly and harmfully effect the usefulness of the bituminous emulsion, when such an emulsion is employed as, for instance, in road building. The ductility and penetration of the resulting asphalt are lowered and the melting point is raised. Most governmental specifications limit content of allowable insoluble material to less than 3%.

In addition, quick setting primary emulsions are very sensitive to the addition of finely divided solids in either dry or wet form. There appears to be a mutual attraction between the dispersed asphalt globules and the fine, solid substance which causes agglomeration of particles commonly known as "buckshot" formation. The "buckshot" tends to gravitate to the bottom of the containing vessel with the result that a considerable portion of the asphalt settles out. Most governmental specifications place narrow limits on the allowable settlement of a bituminous emulsion product.

Applicants have discovered that rather than try to remove the calcium in the waste sulfite liquor it is preferable to treat the liquor with compounds which will unite with the calcium in the waste liquor to form complex, water-soluble, highly stable, substantially un-ionized compounds which are in equilibrium with the loosely bound calcium present in the calcium ligno-sulfonate of the waste sulfite liquor. The complex calcium compounds which are formed when such substances are added are highly soluble in water and result in no precipitation. Hence the expensive, and only partially effective, steps of decanting or filtering are eliminated, and the harmful effect of any unremoved precipitated calcium compounds is also eliminated. The complex calcium compounds formed are only very slightly ionized and are highly stable, with the result that the formation of insoluble calcium soaps is substantially completely suppressed.

Applicants' invention, illustrated above by reference to use of waste sulfite liquor, comprises a new method of manufacturing highly stable bituminous emulsions involving the use of a solubilizing or suppressing agent capable of preventing the formation of water insoluble alkali earth metal soaps normally injurious to quick-breaking, primary emulsions. The solubilizing or suppressing agent for insoluble soaps, such as calcium soaps, is understood to enter into a complex compound with the free ions of the insoluble-soap-forming element, such as the calcium ion, to form a water-soluble stable, substantially un-ionized compound. The water-insoluble-soap suppressing agent is not employed in amounts sufficient to contribute in and of itself any substantial stability against cycles of heat and cold and the addition of finely divided solids such as Portland cement.

A specific example of the utilization of applicants' invention is described below wherein in this embodiment waste sulfite liquor is used as the stabilizer. A primary, quick-breaking, penetration type emulsion is first prepared by means, for instance, of melted asphalt and alkaline water as described in the United States patent to Montgomerie, No. 1,643,675, wherein the emulsifying agent consists of reaction products of alkaline water and naturally occurring asphaltogenic acids in the asphalt. Such emulsions are not stable against electrolytes, road metals and the addition of Portland cement and other types of finely divided solids. An amount of tetrasodium pyrophosphate, equal to about .47% by weight of the final stable emulsion eventually to be formed, is dissolved in water. Such tetrasodium pyrophosphate constitutes the agent employed in this example as the solubilizing agent for insoluble soaps. To the water used to dissolve the tetrasodium pyrophosphate is added the calcium-containing waste sulfite liquor in an amount equal to about 1.20% of the stabilized emulsion to be finally formed. In such water used to dissolve the tetrasodium pyrophosphate and the waste sulfite liquor is added an amount of an acid, such as boric acid, sufficient to bring the pH of final stable emulsion to be formed to about 9.

The aqueous solution of insoluble-soap suppressing agent, stabilizer and acid for pH adjustment is then added to the basic primary emulsion for the formation of a highly stable emulsion which will not break upon thawing after having been frozen, and to which useful quantities of finely divided solids, such as sand and Portland cement, as well as electrolytes and acidic substances may be safely added.

In the example mentioned above tetrasodium pyrophosphate and boric acid were utilized. As appears more clearly above and below, other substances may, respectively, be substituted.

Also, the order of steps followed in the example given above may be varied. An aqueous solution of tetrasodium pyrophosphate, or substitute compound used, may be added directly to the primary emulsion followed by the calcium-containing waste sulfite liquor, followed by the acid used to adjust the pH of the final stabilized emulsion. If it is convenient so to do, the tetrasodium pyrophosphate, or substitute compound used, and also the calcium-containing waste sulfite liquor, may be added to the alkaline water used to prepare the primary emulsion after which the acid for pH adjustment is added. The method of dissolving the acid in the water solution of the stabilizer and soap-suppressing agent has four definite advantages: Since less water is used there is less dilution of the final stabilized emulsion; the more acid the reaction of the stabilizer solution the greater is its stabilizing effect; the danger of adding raw acid to the primary emulsion is eliminated; manufacturing operations are simplified.

A two thousand pound batch of primary emulsion was formed with melted, 180–200 penetration, California asphalt and alkaline water as described in the United States patent to Montgomerie, No. 1,643,675. The whole batch of preformed primary emulsions was then divided into four five-hundred pound batches which were separately processed as shown in Table II below, percentages shown being by weight:

Table II

|  | SB-4 | SB-5 | SB-6 | SB-7 |
|---|---|---|---|---|
|  | Per cent | Per cent | Per cent | Per cent |
| Primary emulsion (130° F.) | 94.48 | 94.61 | 94.63 | 94.61 |
| Waste calcium sulfite liquor | 1.18 | 1.18 | 1.18 | 1.18 |
| Tetrasodium pyrophosphate | .47 | .47 | .47 | .47 |
| Boric acid | .33 |  |  |  |
| Oxalic acid (99%) |  | .19 |  |  |
| Acetic acid (99%) |  |  | .17 |  |
| Phosphoric acid (100%) |  |  |  | .19 |
| Water | 3.54 | 3.55 | 3.55 | 3.55 |
|  | 100.00 | 100.00 | 100.00 | 100.00 |

The resultant, highly stable emulsions were tested as shown in Table III below:

*Table III*

| Tests | SB-4 | SB-5 | SB-6 | SB-7 |
|---|---|---|---|---|
| Residue (hot plate) | 56.2% | 56.0% | 57.4% | 58.0%. |
| Screen test (20 mesh) | .002% | .003% | .008% | .007%. |
| Demuls. 50 cc./N/10 $CaCl_2$ | 0 | 0 | 0 | 0. |
| Cement test | OK—fluid | OK—fluid | OK—fluid | OK—fluid. |
| Dilution (2 hours) | Passes | Passes | Passes | Passes. |
| pH | 8.9 | 8.9 | 8.95 | 9.05. |
| Viscosity (seconds) | 20.2 | 20.2 | 22.3 | 21.4. |
| Dehydration (96 hours) | .875 | .895 | .845 | .852. |
| Settlement (5 days): | | | | |
| Top | 56.2 | 56.0 | 57.6 | 58.2. |
| Bottom | 55.6 | 55.8 | 57.4 | 58.0. |
| Diff | —.6% | —.2% | —.2% | —.2%. |
| Skin (30-gal. drum) | Very sl. trace | Very sl. trace | Very sl. trace | Very sl. trace. |
| (TESTS ON DISTILL. RESIDUE) | | | | |
| Penetration 32° F | 29 | 29 | 33 | 33. |
| Penetration 77° F | 174 | 168 | 171 | 173. |
| Ductility 32° F | 1.0 | 13.0 | 0 | 23.0 |
| Ductility 77° F | 137 | 120 | 110 | 130. |
| Melting point (R & B) | 100° F | 104° F | 103° F | 101° F. |
| Sol. 86° Bé. gasoline | 84.5% | 87.4% | 86.9% | 87.5%. |
| Sol. $CCl_4$ | 97.2% | 99.6% | 98.7% | 99.9%. |
| Specific gravity 77°/77° F | 1.019 | 1.010 | 1.005 | 1.013. |

Applicants have found that in the use of their process it is important that the pH of the final stabilized emulsion be carefully adjusted. Although it is possible to make stable emulsions of the kind described in this application with the final pH range 4.5 to 9.5, an incipient gel structure appears to occur in the emulsion if the pH is below 6.0. A safe working range from a practical standpoint would be within the limits of pH 6.0 to 9.5.

In general, any acid or acid reacting salt of organic or inorganic origin may be used for adjusting the pH range of the emulsion product of applicants' process. Among such acids are acetic, boric, phosphoric, oxalic, lactic. Solutions of weak acids, however, such as boric acid, are preferred because of their mild action on the emulsion. The stronger acids, such as hydrochloric acid, have a tendency to produce shot in the final emulsion when such acids are added before the pH of the final emulsion has been adjusted to 9 or below. The use of boric acid has the disadvantage of lower solubility in water, 2.66 parts per 100 at 32° F., and, therefore, in order to obtain a sufficiently concentrated solution for practical handling, it is necessary to use it in a hot solution by dissolving it in water heated above 175° F.

Calcium-containing sulfite liquor, which is one of the various stabilizers to which applicants' invention is applicable, is widely obtainable in either dry or liquid form. One desirable type is dried hemlock cellulose sulfite liquor, which is a yellowish-brown powder which readily forms an aqueous solution of acid reaction. A typical analysis of such dry powder is as follows:

*Table IV*

| | Per cent |
|---|---|
| Total solids | 97.76 |
| Non-tannins | 47.48 |
| Tannins | 47.48 |
| Ash | 7.90 |
| Lime (CaO) | 5.26 |
| Iron and aluminum oxides | 0.20 |
| Ash—insoluble in acid | 0.12 |
| Magnesium oxide | 0.29 |
| Sulphates | 2.00 |
| Total acidity (as acetic acid) | 5.70 |

This dry powder usually has a pH in distilled water 3.8 to 5.0. At 240° F. it leaves a 92.3% residue of solids. Though it has excellent inherent stabilizing and emulsifying qualities for bituminous emulsions, if added untreated, or without the practice of applicants' process, to a preformed unstable oil-in-water emulsion it will cause such emulsion to break immediately because of its free calcium content.

Calcium-containing waste sulfite liquor is also obtainable in liquid form, usually in a syrupy form. Waste sulfite liquors are available in large quantities as a waste product of the paper pulp industry. The disposal of waste liquors of the paper industry, of which waste sulfite is one of the largest in volume, is a problem of national importance and constitutes one of the greatest economic wastes in the world today. In the pulp industry, for every ton of pulp produced there is roughly an equal amount of materials from the original wood to be found in the waste liquors.

Applicants have found it desirable that the solid content of the waste sulfite liquor employed be not too low. If the solid content is low, a relatively large volume of the stabilizer solution must be used, with the result that the emulsion is excessively diluted. Preferably, the solid content should not be less than 50%.

The amount of the waste sulfite liquor employed will vary somewhat with the type of emulsion to be stabilized and the extent of the stabilization desired. Applicants have found no occasion to use more than 2% by weight (dry basis) of the primary emulsion to be stabilized. Satisfactory results are usually obtained with as little as 1.25%.

It will be clear that while applicants' process has been illustrated primarily in regard to use of waste calcium sulfite liquor as the stabilizing agent, applicants' process is not limited to the use of waste calcium sulfite liquor. Applicants' process is applicable in any instance where the ingredients used in manufacturing the stable bituminous oil-in-water emulsions contain or release free ions, such as free calcium ions, and such ions combine with various ingredients either of the asphalt or ingredients used in manufacture of the emulsion to form water-insoluble alkali earth metal soaps, such as calcium soaps, and such formation of water-insoluble alkali earth metal soaps causes the primary oil-in-water emulsion to break wholly or in part. As pointed out above, applicants' process involves the use of a compound which enters into a complex chemical relationship with the water-insoluble alkali earth metal soap-forming element, such as calcium, whereby there is formed a water-soluble, inert, substantially un-ionized compound which is incapable of forming the destructive water-insoluble alkali earth metal soaps. Such compounds take up the free water-insoluble alkali earth metal soap-forming ions regardless of the source of such ions.

It will be obvious that applicants' invention as described above is applicable to the stabilization of any primary bituminous emulsion which is dependent for its primary emulsification on the reaction between an alkali and an organic acid, said organic acid either being wholly or partly present naturally or being added wholly or in part. The product of the reaction between the acid and the free alkali supplies the primary emulsifier. The presence of free calcium ions, for instance, in connection therewith is considered to result in the formation of calcium soaps, which soaps are substantially insoluble in aqueous media. Applicants prefer to practice their invention in connection with the stabilization of primary emulsions prepared as described in the United States patents to Montgomerie and Braun, numbered respectively 1,643,675 and 1,737,491. Applicants have found it highly desirable that primary emulsions to be stabilized according to their invention do not contain asphalts having in excess of 0.5% of low molecular weight fatty acids.

As applicants have explained above, applicants' process is dependent upon the use of a small amount of a suppressing or solubilizing agent for water-insoluble alkali earth metal soaps, such as tetrapotassium pyrophosphate, which has the capacity of entering into a complex compound with any said water-insoluble soap forming element present in the stabilizer or ingredients of the emulsion whereby there is formed a highly stable, substantially un-ionized, water-soluble compound of the water-insoluble alkali earth metal soap forming element and the soap-suppressing agent. Such element, then having been taken into the water-soluble complex molecule formed with the soap-suppressing agent, is no longer free to exert its usual emulsion-breaking tendencies.

Any compound which has the characteristics set forth above is within the scope of applicants' invention. Compounds such as tri-sodium phosphate or sodium carbonate do not fall in this class because their alkali earth metal compounds are substantially insoluble in water. The precipitates formed by their use are highly objectionable as pointed out above.

As pointed out above, applicants' invention is applicable in connection with the use of any of the numerous agents which act as solubilizing or dispersing agents for insoluble alkali earth metal soaps having a demulsifying effect on oil-in-water bituminous emulsions. Included among such compounds are tetrapotassium pyrophosphate ($K_4P_2O_7$); tetrasodium pyrophosphate ($Na_4P_2O_7$); sodium hexametaphosphate $$Na_6(PO_3)_6$$

potassium hexametaphosphate $K_6(PO_3)_6$. These water-solubilizing agents are commonly referred to as of the molecularly dehydrated phosphate type. Applicants prefer to use the compounds mentioned above but other alkali-metal metaphosphates and pyrophosphates are usable, such as lithium pyrophosphates, lithium metaphosphates, or ammonium meta and pyrophosphates. When the primary emulsion to be stabilized is prepared by dispersing liquid asphalt in an aqueous sodium hydroxide solution, potassium pyrophosphates, such as tetrapotassium pyrophosphate are preferred over the sodium pyrophosphates because of the elimination of any excessively high sodium ion pressure otherwise brought to bear on the emulsion by reason of using both sodium hydroxide and the sodium pyrophosphates.

Applicants have obtained excellent results with the suppressing or solubilizing agents for water-insoluble alkali earth metal soaps described herein by using them in amounts as small as .47% by weight, of the finished, stabilized emulsion. Of course, the percentage of the suppressing agent which is used will depend on the amount of the alkali earth metal water-insoluble soap forming element to be overcome. Where, for instance, such element is calcium, in principle, the solubilizing agent should be added in amounts in excess of that required to combine with the calcium to form calcium metaphosphate or calcium pyrophosphate. Upon the addition of an excess there is no precipitation of calcium pyrophosphate or calcium metaphosphate. A practical method of determining the amount of the soap-suppressing agent to use with the particular stabilizer employed is to add increasing increments of the suppressing agent to samples of the stabilizer employed and then add the mixtures to samples of the primary, quick-breaking type emulsion employed. Coagulation of the primary emulsion will continue to occur up to the point where the amount of the suppressing agent is sufficient to counteract the coagulating or breaking effect of the water-insoluble alkali earth metal soap-forming element in the stabilizer.

It should be noted that the said alkali earth metal soap-suppressing agents are not employed as stabilizers or emulsifiers but as aids to stabilizers and emulsifiers.

Applicants have found it most advantageous when stabilizing a primary quick-breaking emulsion to apply the combination of stabilizer and said soap-suppressing agent to the primary emulsion when the latter has been allowed to cool below 150° F. and preferably below 100° F.

It will be clear that while applicants have more often herein exemplified their process in the stabilization of preformed unstable emulsions, it is not necessary first to manufacture the primary emulsion. The manufacture may be effected in one step, as pointed out above, by including the ingredients, other than the acid used to adjust pH, used in the practice of applicants' process in the water used for the emulsification after which the acid may be added.

Applicants have also pointed out above that wherever the word "calcium" has been used herein it is to be understood that "magnesium" may be substituted. Likewise, applicants' invention is not to be deemed limited to its relationship to free calcium and magnesium ions, but it will be clear is equally applicable to other similar free ions capable of forming insoluble soaps which are deleterious to the formation or stability of oil-in-water emulsions.

Stable emulsions prepared according to applicants' process have numerous advantages. They are highly stable to cycles of heat and freezing cold. They may be safely mixed with both fine and coarse aggregates, including rock and fine sand, and mixtures of aggregates and finely divided solids such as Portland cement. They may be stored over periods without deterioration and they are highly resistant to the addition of electrolytes. Applicants' emulsions are excellent for use in soil stabilization.

Emulsions prepared in accordance with applicants' process have been found to have unusual properties when used as an admixture for concrete. Extensive tests have shown that concrete stabilized with stable emulsions prepared according to applicants' process has unusual structural strength and greatly improved workability for a given water-cement ratio, thereby aiding in the production of a denser concrete with water repellent properties. Unlike the emulsions prepared according to applicants' process, ordinary bituminous emulsions when added to concrete usually stiffen the concrete mixture and cause the use of more water to obtain workability. In addition, concrete containing emulsions prepared according to applicants' process shows an unexpected toughness and resistance to shattering impact and is substantially waterproof.

Applicants have found that in employing emulsions made according to their invention in the manufacture of cement mortars, the adjustment of pH is of vital importance. Applicants' emulsions, after having been manufactured as described above, may safely have added to them large amounts of electrolytes without any harmful effect on the emulsion. When manufacturing emulsions for addition to concrete mortars, applicants take advantage of this quality of their emulsion by adding acid-reacting substances, such as hydrochloric acid or calcium chloride, to lower the pH of the emulsion. The lowering of the pH of the emulsion results in greatly improved workability and in early strength of the cement. Table V below shows comparative results with treatment and non-treatment of cement mortars with applicants' emulsions at various pH values.

Table V

|  | Sample | | | | | | |
|---|---|---|---|---|---|---|---|
|  | 1 | 2 | 3 | 4 | 5 | 6 | 7 |
| Cement/sand | 1-3 | 1-3 | 1-3 | 1-3 | 1-3 | 1-3 | 1-3 |
| Cement/water | 1-.9 | 1-.9 | 1-.9 | 1-.9 | 1-.9 | 1-.9 | 1-.9 |
| Cement/emulsion | 5-1 | 5-1 | 5-1 | 5-1 | 5-1 | 5-1 |  |
| Acidizer | 0 | HCl | HCl | $CaCl_2$ | $CaCl_2$ | $CaCl_2$ | 0 |
| pH of emulsion | 8.5 | 7.5 | 6.5 | 7.5 | 7.2 | 7.0 |  |
| Slump test, inches | 2 3/16 | 5 1/8 | 6 | 3 | 5 3/4 | 6 1/8 | 5/8 |
| Crushing strength, lbs./sq. in. comp.[1] | 2,137 | 2,730 | 2,985 | 2,518 | 2,407 | 2,412 | 2,690 |

[1] 7 days damp curing, 24 hrs. oven drying at 140° F.

As shown in Table V, the use of the emulsion in cement mortars results in greatly improved workability as shown by the slump tests, the improvement being from 5/8 inch, in the case of the mortar tested without the emulsion, to 6 1/8 inches in Sample 6. Likewise, the tests indicate improvement in both workability and in early compression strength by neutralization of the emulsion employed.

In the above connection applicants' invention has the decided advantage that it is possible to produce an emulsion, stable in the presence of finely divided solids, such as Portland cement, even though employing a primary emulsion made by stirring liquefied asphalt into alkaline water, as described in Montgomerie Patent No. 1,643,675. Such emulsions are usually unstable against the addition of acids and finely divided solids and have a pH in the order of 12 or more. However, when such primary emulsions are stabilized according to applicants' process, the pH of the resulting stabilized emulsion may be safely reduced to pH 6.5 without any loss of desired properties, including stability in storage.

When bringing the pH of the stable emulsions made according to their invention down to as low as 6.5, applicants have found it highly advantageous to effect this reduction at two stages. A sufficient amount of a mild acid, such as acetic, boric, oxalic, is first used in the manner explained above, to bring the pH of the emulsion down to about 9.5. At this stage the emulsion has been rendered extremely stable and relatively large amounts of acid reacting or forming substances may be safely added. Applicants then prefer to add a stronger, cheaper acid, such as hydrochloric, or to add calcium chloride, sufficient to bring the pH down to about 6.5, when such is desirable, as, for instance, in making an emulsion to be used as an admix with concrete mortar. The preliminary use of a mild acid to bring the pH down to around 9.5 has the advantage that the tendency of the strong acids to form "buckshot" is avoided. After complete stabilization has been reached around 9.5 the stronger acids may be safely employed with consequent saving in cost and elimination of excessive dilution of the emulsion.

The terms "demulsify" and "demulsification" as utilized in this specification and the appended claims are inclusive of separation and inversion of the emulsion phases.

In the disclosure of applicants' invention reference is made to specific examples to illustrate the best ways known of practicing applicants' invention. However, the invention sought to be protected by Letters Patent of the United States is not to be construed to be limited to the specific details of such examples, but includes variations and modifications within the scope and extent of the appended claims.

We claim:

1. The process of manufacturing a fluid bitumen-in-water type emulsion, stable in storage and to fluctuations in temperature, additions of electrolytes and Portland cement, said emulsion owing its emulsification substantially to the reaction products of naturally occurring asphaltogenic acids and an alkali, comprising dispersing hot molten bituminous material in alkaline water, stabilizing the emulsion so prepared by incorporating therein waste sulfite liquor containing, as an undesired constituent thereof, an alkaline earth metal salt selected from the group consisting of calcium and magnesium salts, said alkaline earth metal salt normally having the property of destroying said emulsion by formation of water-insoluble soaps of said alkaline earth metal, and including in said emulsion, not later than with the addition of said waste sulfite liquor, a molecularly dehydrated phosphate type water-solubilizing agent for water-insoluble soaps of said alkaline earth metal, said alkaline earth metal entering into a water-soluble, substantially un-ionized complex with said solubilizing agent, the pH of said bituminous emulsion being adjusted to the range of 4.5 to 9.5.

2. The process of manufacturing a fluid bitumen-in-water type emulsion, stable in storage and to fluctuations in temperature, additions of electrolytes and Portland cement, said emulsion owing its emulsification substantially to the reaction products of naturally occurring asphaltogenic acids and an alkali, comprising dispersing hot molten bituminous material in alkaline water, stabilizing the emulsion so prepared by incorporating therein waste sulfite liquor containing, as an undesired constituent thereof, an alkaline earth metal salt selected from the group consisting of calcium and magnesium salts, said alkaline earth metal salt normally having the property of destroying said emulsion by the formation of water-insoluble soaps of said alkaline earth metal, and including in said emulsion, not later than with the addition of said waste sulfite liquor, a molecularly dehydrated phosphate type water-solubilizing agent for water-insoluble soaps of said alkaline earth metal, said alkaline earth metal entering into a water-soluble, substantially un-ionized complex with said solubilizing agent, said water-solubilizing agent for alkaline earth metal soaps comprising potassium pyrophosphate, the pH of said bituminous emulsion being adjusted to the range of 4.5 to 9.5.

3. The process of manufacturing a fluid bitumen-in-water type emulsion, stable in storage and to fluctuations in temperature, additions of electrolytes and Portland cement, said emulsion owing its emulsification substantially to the reaction products of naturally occurring asphaltogenic acids and an alkali, comprising dispersing hot molten bituminous material in alkaline water, stabilizing the emulsion so prepared by incorporating therein waste sulfite liquor containing, as an undesired constituent thereof, an alkaline earth metal salt selected from the group consisting of calcium and magnesium salts, said alkaline earth metal salt normally having the property of destroying said emulsion by formation of water-insoluble soaps of said alkaline earth metal, and including in said emulsion, not later than with the addition of said waste sulfite liquor, a molecularly dehydrated phosphate type water-solubilizing agent for water-insoluble soaps of said alkaline earth metal, said alkaline earth metal entering into a water-soluble, substantially un-ionized complex with said solubilizing agent, said water-solubilizing agent for alkaline earth metal soaps comprising an alkali metal pyrophosphate, the pH of said bituminous emulsion being adjusted to the range of 4.5 to 9.5.

4. A fluid bitumen-in-water type bituminous emulsion, stable in storage, to fluctuations in temperature, additions of electrolytes and Portland cement, said emulsion comprising a preformed, quick-breaking emulsion of bitumen held in dispersion in water substantially by a primary emulsifying agent consisting essentially of the reaction products of naturally-occurring asphaltogenic acids and an alkali, said primary emulsifying agent being sensitive to alkaline earth metal ions selected from the group consisting of calcium and magnesium ions, said primary emulsifying agent normally reacting chemically with said ions to form water-insoluble alkaline earth metal compounds, the formation of which normally causes said emulsion to break, a stabilizer for said quick-breaking emulsion comprising waste sulfite liquor containing an amount of at least one of such alkaline earth metal ions normally sufficient to cause said emulsion to break, and a small amount, based on said emulsion, of a molecularly dehydrated phosphate type water-solubilizing agent for said water-insoluble alkaline earth metal compounds, said small amount of said agent being sufficient to hold said alkaline earth metal in solution in said emulsion in the form of a water-soluble substantially un-ionized complex with said water-solubilizing agent whereby the breaking of said emulsion by said alkaline earth metal is prevented, said emulsion having a pH of from about 4.5 to 9.5.

5. A fluid bitumen-in-water type bituminous emulsion, stable in storage, to fluctuations in temperature, additions of electrolytes and Portland cement, said emulsion comprising a preformed, quick-breaking emulsion of bitumen held in dispersion in water substantially by a primary emulsifying agent consisting essentially of the reaction products of naturally-occurring asphaltogenic acids and an alkali, said primary emulsifying agent being sensitive to alkaline earth metal ions selected from the group consisting of calcium and magnesium ions, said primary emulsifying agent normally reacting chemically with said ions to form water-insoluble alkaline earth metal compounds, the formation of which normally causes said emulsion to break, a stabilizer for said quick-breaking emulsion comprising waste sulfite liquor containing an amount of at least one of such alkaline earth metal ions normally sufficient to cause said emulsion to break, and a small amount, based on said emulsion, of a molecularly dehydrated phosphate type water-solubilizing agent for said water-insoluble alkaline earth metal compounds, said water-solubilizing agent comprising an alkali metal pyrophosphate, said small amount of said agent being sufficient to hold said alkaline earth metal in solution in said emulsion in the form of a water-soluble substantially un-ionized complex with said alkali metal pyrophosphate whereby the breaking of said emulsion by said alkaline earth metal is prevented, said emulsion having a pH of from about 4.5 to 9.5.

VILAS E. WATTS.
PAUL E. McCOY.